(12) United States Patent
Li

(10) Patent No.: US 10,311,803 B2
(45) Date of Patent: Jun. 4, 2019

(54) BACKLIGHT DRIVING CIRCUIT AND LIQUID CRYSTAL DISPLAY

(71) Applicant: Shenzhen China Star Optoelectronics Technology Co., Ltd., Shenzhen, Guangdong (CN)

(72) Inventor: Wendong Li, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 95 days.

(21) Appl. No.: 15/535,447

(22) PCT Filed: Mar. 29, 2017

(86) PCT No.: PCT/CN2017/078634
§ 371 (c)(1),
(2) Date: Jun. 13, 2017

(87) PCT Pub. No.: WO2018/149020
PCT Pub. Date: Aug. 23, 2018

(65) Prior Publication Data
US 2018/0374430 A1    Dec. 27, 2018

(30) Foreign Application Priority Data

Feb. 20, 2017    (CN) .......................... 2017 1 0089993

(51) Int. Cl.
*G06F 3/041*    (2006.01)
*G09G 3/34*    (2006.01)
(Continued)

(52) U.S. Cl.
CPC ....... *G09G 3/3406* (2013.01); *G02F 1/13306* (2013.01); *G02F 1/133602* (2013.01);
(Continued)

(58) Field of Classification Search
CPC ... G09G 2300/0452; G09G 2320/0606; G09G 2320/0626; G09G 2320/0646;
(Continued)

(56) References Cited

U.S. PATENT DOCUMENTS

2010/0073041 A1*  3/2010  Djenguerian ..... H02M 3/33523
                                                    327/143
2014/0175885 A1*  6/2014  Shih ........................ H02M 1/36
                                                    307/31

FOREIGN PATENT DOCUMENTS

CN        201663735 U     12/2010
CN        101958527 A      1/2011
(Continued)

*Primary Examiner* — Insa Sadio
(74) *Attorney, Agent, or Firm* — Andrew C. Cheng

(57) ABSTRACT

Provided is a backlight driving circuit, comprising voltage conversion circuit, PMW controller, zener diode, first electrical switch, optocoupler unit, boost switch and light source drive assembly. The PMW controller controls an output of the voltage conversion circuit. The light source drive assembly is connected to the boost switch and a light source to control on and off of the boost switch. A cathode of the zener diode is connected to the optocoupler unit, and an anode of the zener diode is connected to a control end of the first electric switch, and a first end of the first electrical switch is connected to the PWM controller, and a second end of the first electrical switch is grounded, and as the boost switch is short, a current outputted by the voltage conversion circuit increases, and the optocoupler unit breaks the zener diode down.

18 Claims, 1 Drawing Sheet

(51) Int. Cl.
*G02F 1/1335* (2006.01)
*G02F 1/133* (2006.01)
*G09G 3/36* (2006.01)

(52) U.S. Cl.
CPC ............ *G02F 2001/133612* (2013.01); *G09G 3/3648* (2013.01); *G09G 2320/064* (2013.01)

(58) Field of Classification Search
CPC ......... G09G 2320/08; G09G 2330/021; G09G 2360/144; G09G 3/34; G09G 5/10
See application file for complete search history.

(56) References Cited

FOREIGN PATENT DOCUMENTS

| | | |
|---|---|---|
| CN | 103065589 A | 4/2013 |
| CN | 103178717 A | 6/2013 |
| CN | 104302058 A | 1/2015 |
| CN | 204180331 U | 2/2015 |
| CN | 205541824 U | 8/2016 |

* cited by examiner

BACKLIGHT DRIVING CIRCUIT AND LIQUID CRYSTAL DISPLAY

CROSS REFERENCE

This application claims the priority of Chinese Patent Application No. 2017100899938, entitled "Backlight driving circuit and liquid crystal display", filed on Feb. 20, 2017, the disclosure of which is incorporated herein by reference in its entirety.

FIELD OF THE INVENTION

The present invention relates to a display technical field, and more particularly to a voltage output control circuit and a liquid crystal display.

BACKGROUND OF THE INVENTION

In the present panel design, the proportion of the large-scale products gradually increased. The backlight power supply circuit as driving the large-scale products, such as televisions, is more complex. In the present television backlight driving circuit, due to the boost of the light emitting diode, the drive switch transistor will occur short circuit phenomenon. In the backlight driving circuit, the transformer primary over-power protection method is usually utilized. The PWM integrated chip is restarted for a period of time to result in a high temperature of the drive switch transistor and thus the safety standards are not met.

SUMMARY OF THE INVENTION

An objective of the present invention is to provide a backlight driving circuit to reduce the temperature of the drive switch transistor for satisfying the safety standards.

Another objective of the present invention is to provide a liquid crystal display.

For realizing the aforesaid objective, the technical solution provided by the embodiments of the present invention is:

The present invention provides a backlight driving circuit, applied in a liquid crystal display, wherein the backlight driving circuit comprises a voltage conversion circuit, a PWM controller, a zener diode, a first electrical switch, an optocoupler unit, a boost switch and a light source drive assembly, and the voltage conversion circuit is used to connect an input voltage end to receive an input voltage and to conduct a voltage conversion of the input voltage, and the voltage conversion circuit is also connected to the optocoupler unit, the PWM controller, the boost switch and a light source of the liquid crystal display to output a converted voltage to the optocoupler unit, the PWM controller, the boost switch, and the light source, and the PWM controller is used to control an output of the voltage conversion circuit, and the light source drive assembly is connected to the boost switch and the light source to control on and off of the boost switch according to a light source condition, and a cathode of the zener diode is connected to the optocoupler unit, and an anode of the zener diode is connected to a control end of the first electric switch, and a first end of the first electrical switch is connected to the PWM controller, and a second end of the first electrical switch is grounded; as the boost switch is short, a current outputted by the voltage conversion circuit increases, and a voltage of the optocoupler unit fed back to the zener diode is larger than a breakdown voltage, and the zener diode is on and then, the first electric switch is on, and the PWM controller stops working to turn off the boost switch.

The voltage conversion circuit comprises a transformer, a second electrical switch, a first resistor, a first capacitor, a first diode, a second diode and a second resistor, and the input voltage end is connected to a first end of a first primary coil of the transformer and is connected to a cathode of the first diode through the first resistor, and the first capacitor is connected in parallel at both ends of the first resistor, and an anode of the first diode is connected to a first end of the second electrical switch, and the anode of the first diode is also connected to a second end of the first primary coil of the transformer, and a control end of the second electrical switch is connected to the PWM controller, and a second end of the second electrical switch is grounded, and a first end of a second primary coil of the transformer is connected to an anode of the second diode, and a cathode of the second diode is connected to a voltage end of the PWM controller through the second resistor, and the voltage end of the PWM controller is connected to the first end of the first electrical switch, and a secondary coil of the transformer is connected to a first end of the boost switch.

The light source drive assembly comprises a third electric switch, a control unit and a third resistor, and a control end of the third electric switch is connected to the control unit, and a first end of the third resistor is connected to the light source, and a second end of the third resistor is grounded through the third resistor, and the control unit is also connected to the boost switch to control the on and off of the boost switch according to a voltage condition of the third resistor.

The optocoupler unit comprises a fourth resistor, a fifth resistor, a sixth resistor, a seventh resistor, a voltage regulator and an optocoupler, and the fourth resistor and the fifth resistor are connected in series between the secondary coil of the transformer and a first end of the voltage regulator, and a second end of the voltage regulator is grounded, and the sixth resistor and the seventh resistor are connected the secondary coil of the transformer and a ground, and a reference end of the voltage regulator is connected to a node between the sixth resistor and the seventh resistor, and an anode of a light emitting diode of the optocoupler is connected to a node between the fourth resistor and the fifth resistor, and a cathode of the light emitting diode of the optocoupler is connected to a node between the fifth resistor and the voltage regulator, and a first end of a switch of the optocoupler is connected to the PWM controller and the cathode of the zener diode, and a second end of the switch of the optocoupler is grounded.

The voltage conversion circuit further comprises a third diode, the fourth diode and a second capacitor, and an anode of the third diode is connected to an anode of the fourth diode and also connected to a first end of the secondary coil of the transformer, and a cathode of the third diode is connected to the anode of the fourth diode and also connected to a positive electrode of the second capacitor, and a negative electrode of the second capacitor is ground, and a second end of the secondary coil of the transformer is grounded.

The voltage conversion circuit further comprises a third capacitor and a fourth capacitor, and a positive electrode of the third capacitor is connected to the input voltage end, and a negative electrode of the third capacitor is grounded, and the fourth capacitor is connected in parallel at both ends of the third capacitor.

The backlight driving circuit further comprises a fifth capacitor and a sixth capacitor, and a positive electrode of the fifth capacitor is connected to the cathode of the second diode through the second resistor, and a negative electrode of the fifth capacitor is grounded, and a positive electrode of the sixth capacitor is connected to the cathode of the third diode, and a negative electrode of the sixth capacitor is grounded.

The backlight driving circuit further comprises a fifth diode, an energy storage inductor and a seventh capacitor, an anode of the fifth diode is connected to the cathodes of the third diode and the fourth diode through the energy storage inductor, and a cathode of the fifth diode is connected to the anode of the light source, a cathode of the light source is connected to the first end of the third electrical switch, and the cathode of the fifth diode is also connected to a positive electrode of the seventh capacitor, and a negative electrode of the seventh capacitor is grounded.

The boost switch, the second electrical switch and the third electrical switch are all NPN type transistors, and the control end, the first end and the second end of the boost switch, the control end, the first end and the second end of the second electrical switch and the control end, the first end and the second end of the third electrical switch respectively are gates, drains and sources, and the first electrical switch is an NPN type triode, and the control end, the first end and the second end of the first electrical switch respectively are a base, a collector and an emitter.

The present invention further provides a liquid crystal display, comprising a light source and the aforesaid backlight driving circuit, and the backlight driving circuit is connected to the light source.

The embodiments of the present invention have advantages or benefits:

The backlight driving circuit comprises a voltage conversion circuit, a PWM controller, a zener diode, a first electrical switch, an optocoupler unit, a boost switch and a light source drive assembly, and the voltage conversion circuit is used to connect an input voltage end to receive an input voltage and to conduct a voltage conversion of the input voltage, and the voltage conversion circuit is also connected to the optocoupler unit, the PWM controller, the boost switch and a light source of the liquid crystal display to output a converted voltage to the optocoupler unit, the PWM controller, the boost switch, and the light source, and the PWM controller is used to control an output of the voltage conversion circuit, and the light source drive assembly is connected to the boost switch and the light source to control on and off of the boost switch according to a light source condition, and a cathode of the zener diode is connected to the optocoupler unit, and an anode of the zener diode is connected to a control end of the first electric switch, and a first end of the first electrical switch is connected to the PWM controller, and a second end of the first electrical switch is grounded; as the boost switch is short, a current outputted by the voltage conversion circuit increases, and a voltage of the optocoupler unit fed back to the zener diode is larger than a breakdown voltage, and the zener diode is on and then, the first electric switch is on, and the PWM controller stops working to turn off the boost switch. The surface temperature of the boost switch is reduced, not only the safety standards are met but the over-current protection is also achieved.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Besides, the following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In the description of the invention, which needs explanation is that the term "installation", "connected", "connection" should be broadly understood unless those are clearly defined and limited, otherwise, For example, those can be a fixed connection, a detachable connection, or an integral connection; those can be a mechanical connection, or an electrical connection; those can be a direct connection, or an indirect connection with an intermediary, which may be an internal connection of two elements. To those of ordinary skill in the art, the specific meaning of the above terminology in the present invention can be understood in the specific circumstances.

Besides, in the description of the present invention, unless with being indicated otherwise, "plurality" means two or more. In the present specification, the term "process" encompasses an independent process, as well as a process that cannot be clearly distinguished from another process but yet achieves the expected effect of the process of interest. Moreover, in the present specification, any numerical range expressed herein using "to" refers to a range including the numerical values before and after "to" as the minimum and maximum values, respectively. In figures, the same reference numbers will be used to refer to the same or like parts.

Figure 1:
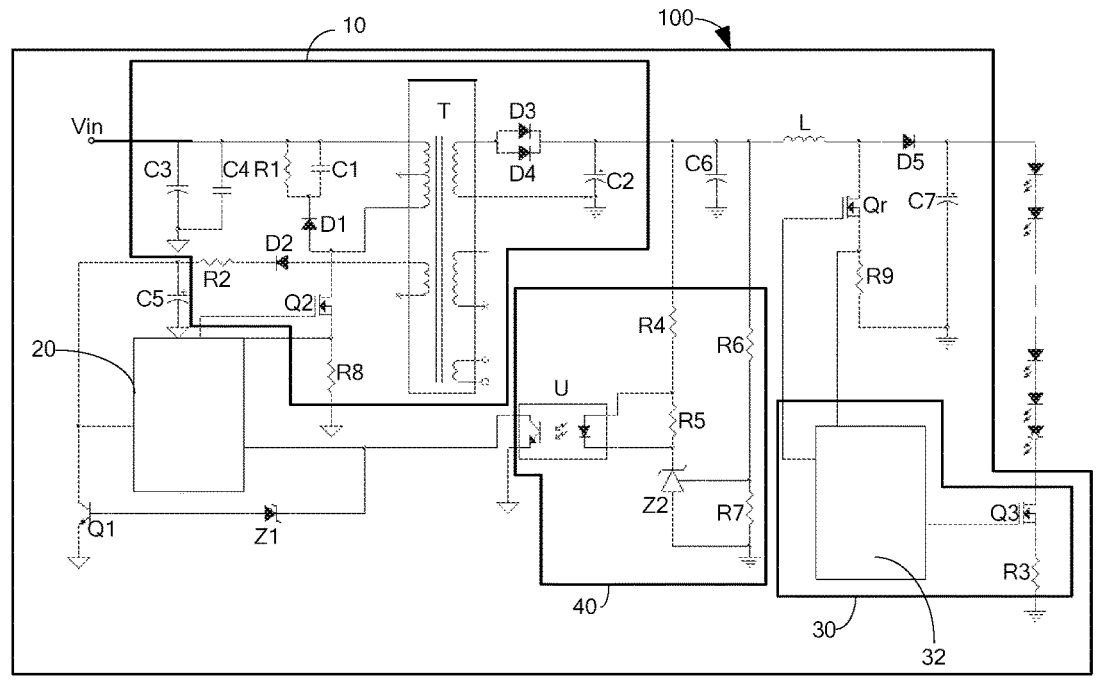
FIG. 1 is a circuit diagram of a backlight driving circuit having an over-current protection function provided by a first embodiment of the present invention.

Please refer to FIG. 1. The first embodiment of the present invention provides a backlight driving circuit 100. The backlight driving circuit 100 is applied in a liquid crystal display for having an over-current protection function while driving the light source of the liquid crystal display to emit light.

The backlight driving circuit 100 comprises a voltage conversion circuit 10, a PWM controller 20, a zener diode Z1, a first electrical switch Q1, an optocoupler unit 40, a boost switch Qr and a light source drive assembly 30, and the voltage conversion circuit 10 is used to connect an input voltage end Vin to receive an input voltage and to conduct a voltage conversion of the input voltage, and the voltage conversion circuit 10 is also connected to the optocoupler unit 40, the PWM controller 20, the boost switch Qr and a light source of the liquid crystal display to output a converted voltage to the optocoupler unit 40, the PWM controller 20, the boost switch Qr, and the light source, and the PWM controller 20 is used to control an output of the voltage conversion circuit 10, and the light source drive assembly 30 is connected to the boost switch Qr and the light source to control on and off of the boost switch Qr according to a light source condition, and a cathode of the zener diode Z1 is connected to the optocoupler unit 40, and an anode of the zener diode Z1 is connected to a control end of the first electric switch Q1, and a first end of the first electrical switch Q1 is connected to the PWM controller 20, and a second end of the first electrical switch Q1 is grounded. As the boost switch Qr is short, the current outputted by the voltage conversion circuit 10 increases, and a voltage of the optocoupler unit 40 fed back to the Zener diode Z1 is larger than a breakdown voltage, and the Zener diode Z1 is on and then, the first electric switch Q1 is on, and the PWM controller 20 stops working to turn off the boost switch Qr.

Specifically, the PWM controller 20 comprises a voltage end, an output end, a detection end and a feedback end. The voltage end of the PWM controller 20 is connected to the voltage conversion circuit 10 to receive a working voltage. The voltage end of the PWM controller 20 is also connected to the first end of the first electrical switch Q1. The output end of the PWM controller 20 is connected to the voltage conversion circuit 10 to control an output of the voltage conversion circuit 10. The detection end of the PWM controller 20 is connected to the voltage conversion circuit 10 to indicate that an abnormality occurs as the voltage outputted to the detection end of the voltage conversion circuit 10 is detected to be larger than a preset value, and the PWM controller stops working. The feedback end of the PWM controller 20 is connected to the optocoupler unit to receive a feedback voltage of the optocoupler unit 40.

Specifically, the light source is light emitting diodes connected in series. The anode of one light emitting diode is the anode of the light source. The cathode of one light emitting diode is the cathode of the light source. The voltage conversion circuit 10 conducts the voltage conversion to the input voltage and provides a voltage to the light source to cause the light source to emit light. In this embodiment, the short circuit of the boost switch Qr means a short circuit between the gate and the drain of the boost switch Qr. When the boost switch Qr is short, the current outputted by the voltage conversion unit 10 is abruptly increased, i.e., the current flowing through the optocoupler unit 40 rises abruptly. The voltage fed back to the feedback end of the PWM controller 20 by the optocoupler unit 40 rises. The voltage of the feedback end of the PWM controller 20 is larger than the breakdown voltage of the Zener diode Z1. The Zener diode Z1 is broke down, and the first electric switch Q1 is on. The voltage end of the PWM controller 20 is grounded. The PWM controller 20 stops working so that the voltage conversion circuit 10 stops outputting. The boost switch Qr is turned off. The surface temperature of the boost switch Qr is reduced, not only the safety standards are met but the over-current protection is also achieved.

Furthermore, the voltage conversion circuit 10 comprises a transformer T, a second electrical switch Q2, a first resistor R1, a first capacitor C1, a first diode D1, a second diode D2 and a second resistor R2, and the input voltage end Vin is connected to a first end of a first primary coil of the transformer T and is connected to a cathode of the first diode D1 through the first resistor R1, and the first capacitor C1 is connected in parallel at both ends of the first resistor R1, and an anode of the first diode D1 is connected to a first end of the second electrical switch Q2, and the anode of the first diode D1 is also connected to a second end of the first primary coil of the transformer T, and a control end of the second electrical switch Q2 is connected to the PWM controller 20, and a second end of the second electrical switch Q2 is grounded, and a first end of a second primary coil of the transformer T is connected to an anode of the second diode D2, and a cathode of the second diode D2 is connected to a voltage end of the PWM controller 20 through the second resistor R2, and the voltage end of the PWM controller 20 is connected to the first end of the first electrical switch Q1, and a secondary coil of the transformer T is connected to a first end of the boost switch Qr.

Specifically, the first resistor R1, the first capacitor C1 and the first diode D1 constitute an RCD absorption unit. The RCD absorption unit is used to absorb the voltage peak of the second electrical switch Q2 to prevent the second electrical switch Q2 from being damaged. The second diode D2 and the second resistor R2 constitute a rectifying unit to rectify the voltage signal of the input voltage of the voltage end of the PWM controller 20.

The voltage conversion circuit 10 further comprises an eighth resistor R8. The second end of the second electrical switch Q2 is grounded through the eighth resistor R8.

Specifically, the voltage detected by the detection end of the PWM controller 20 is the voltage on the eighth resistor R8.

The light source drive assembly 30 comprises a third electric switch Q3, a control unit 32 and a third resistor R3, and a control end of the third electric switch Q3 is connected to the control unit 32, and a first end of the third resistor R3 is connected to the light source, and a second end of the third resistor Q3 is grounded through the third resistor R3, and the control unit 32 is also connected to the boost switch Qr to control the on and off of the boost switch Qr according to a voltage condition of the third resistor R3.

Specifically, the control unit 32 comprises a first output end, a second output end and a detection end. The first output end of the control unit 32 is connected to the control end of the third resistor Q3. The second output end of the control unit 32 is connected to the control end of the boost switch Qr. The detection end of the control unit 32 is connected to the second end of the boost switch Qr. The control unit 32 controls the duty ratio of the PWM signal outputted by the first output end to the control end of the third electric switch Q3 by detecting the current condition flowing through the third resistor R3 to maintain a constant current of the light source. The second output end of the control unit 32 is used to output the PWM signal to the boost switch Qr to control on and off of the boost switch Qr. The control unit 32 is also used to detect the voltage outputted to the control unit 32 by the second end of the boost switch Qr to indicate that an abnormality occurs as the voltage is larger than a preset value, and the control unit 32 stops working.

The backlight driving circuit further comprises a ninth resistor R9. The second end of the boost switch Qr is grounded through the ninth resistor R9.

Specifically, a voltage outputted to the control unit 32 by the second end of the boost switch Qr is the voltage on the ninth resistor R9.

The optocoupler unit 40 comprises a fourth resistor R4, a fifth resistor R5, a sixth resistor R6, a seventh resistor R7, a voltage regulator Z2 and an optocoupler U, and the fourth resistor R4 and the fifth resistor R5 are connected in series between the secondary coil of the transformer T and a first end of the voltage regulator Z2, and a second end of the voltage regulator Z2 is grounded, and the sixth resistor R6 and the seventh resistor R7 are connected the secondary coil of the transformer T and a ground, and a reference end of the voltage regulator Z2 is connected to a node between the sixth resistor R6 and the seventh resistor R7, and an anode of a light emitting diode of the optocoupler U is connected to a node between the fourth resistor R4 and the fifth resistor R5, and a cathode of the light emitting diode of the optocoupler U is connected to a node between the fifth resistor R5 and the voltage regulator Z2, and a first end of a switch of the optocoupler U is connected to the PWM controller 20 and the cathode of the zener diode Z1, and a second end of the switch of the optocoupler U is grounded.

Specifically, the reference end of the voltage regulator Z2 provides a reference voltage. The fourth resistor R4, the fifth resistor R5, the sixth resistor R6 and the seventh resistor R7 are all divider resistors.

The voltage conversion circuit 10 further comprises a third diode D3, the fourth diode D4 and a second capacitor C2, and an anode of the third diode D3 is connected to an anode of the fourth diode D4 and also connected to a first end of the secondary coil of the transformer T, and a cathode of the third diode D3 is connected to the anode of the fourth diode D4 and also connected to a positive electrode of the second capacitor C2, and a negative electrode of the second capacitor C2 is ground, and a second end of the secondary coil of the transformer T is grounded.

Specifically, the third diode D3 and the fourth diode D4 collectively constitute a rectifier to rectify the voltage outputted by the transformer T. The second capacitor C2 functions as an energy storage.

Furthermore, the voltage conversion circuit 10 further comprises a third capacitor C3 and a fourth capacitor C4, and a positive electrode of the third capacitor C3 is connected to the input voltage end Vin, and a negative electrode of the third capacitor C3 is grounded, and the fourth capacitor C4 is connected in parallel at both ends of the third capacitor C3.

Specifically, the third capacitor C3 functions as an energy storage. The fourth capacitor C4 functions as a high frequency filter.

The backlight driving circuit 100 further comprises a fifth capacitor C5 and a sixth capacitor C6, and a positive electrode of the fifth capacitor C5 is connected to the cathode of the second diode D2 through the second resistor R2, and a negative electrode of the fifth capacitor C5 is grounded, and a positive electrode of the sixth capacitor C6 is connected to the cathode of the third diode D3, and a negative electrode of the sixth capacitor C6 is grounded.

Specifically, both the fifth capacitor C5 and the sixth capacitor C6 function as energy storage.

The backlight driving circuit 100 further comprises a fifth diode D5, an energy storage inductor L and a seventh capacitor C7, an anode of the fifth diode D5 is connected to the cathodes of the third diode D3 and the fourth diode D4 through the energy storage inductor L, and a cathode of the fifth diode D5 is connected to the anode of the light source, a cathode of the light source is connected to the first end of the third electrical switch Q3, and the cathode of the fifth diode D5 is also connected to a positive electrode of the seventh capacitor C7, and a negative electrode of the seventh capacitor C7 is grounded.

Specifically, the function of the fifth diode D5 serves to prevent current from being flooded. The seventh capacitor C7 functions as an energy storage.

In this embodiment, the boost switch Qr, the second electrical switch Q2 and the third electrical switch Q3 are all NPN type transistors, and the control end, the first end and the second end of the boost switch Qr, the control end, the first end and the second end of the second electrical switch Q2 and the control end, the first end and the second end of the third electrical switch Q3 respectively are gates, drains and sources, and the first electrical switch Q1 is an NPN type triode, and the control end, the first end and the second end of the first electrical switch Q1 respectively are a base, a collector and an emitter. In other embodiments, the boost switch Qr, the second electrical switch Q2 and the third electrical switch Q3 also can be transistors of other types.

Figure 2:
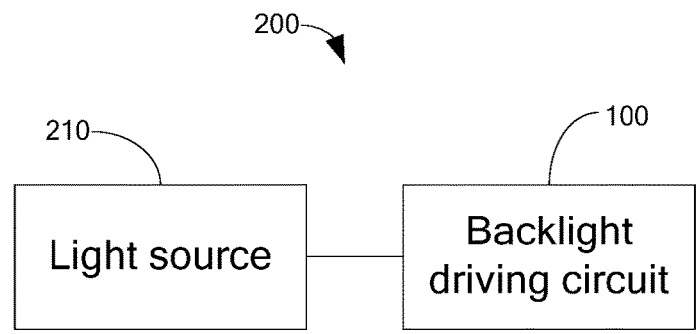
FIG. 2 is a block diagram of a liquid crystal display provided by the second embodiment of the present invention.

Please refer to FIG. 2. The second embodiment of the present invention provides a liquid crystal display 200. The liquid crystal display 200 comprises a light source 210 and a backlight driving circuit connected to the light source 210. The backlight driving circuit can be the backlight driving circuit 100 in the aforesaid first embodiment. The specific structure of the backlight driving circuit 100 has already been described in detail in the aforesaid first embodiment. The repeated description is omitted here.

In this embodiment, the liquid crystal display comprises the backlight driving circuit 100. The backlight driving circuit 100 comprises a voltage conversion circuit 10, a PWM controller 20, a zener diode Z1, a first electrical switch Q1, an optocoupler unit 40, a boost switch Qr and a light source drive assembly 30, and the voltage conversion circuit 10 is used to connect an input voltage end Vin to receive an input voltage and to conduct a voltage conversion of the input voltage, and the voltage conversion circuit 10 is also connected to the optocoupler unit 40, the PWM controller 20, the boost switch Qr and a light source of the liquid crystal display to output a converted voltage to the optocoupler unit 40, the PWM controller 20, the boost switch Qr, and the light source, and the PWM controller 20 is used to control an output of the voltage conversion circuit 10, and the light source drive assembly 30 is connected to the boost switch Qr and the light source to control on and off of the boost switch Qr according to a light source condition, and a cathode of the zener diode Z1 is connected to the optocoupler unit 40, and an anode of the zener diode Z1 is connected to a control end of the first electric switch Q1, and a first end of the first electrical switch Q1 is connected to the PWM controller 20, and a second end of the first electrical switch Q1 is grounded. As the boost switch Qr is short, the current outputted by the voltage conversion circuit 10 increases, and a voltage of the optocoupler unit 40 fed back to the Zener diode Z1 is larger than a breakdown voltage, and the Zener diode Z1 is on and then, the first electric switch Q1 is on, and the PWM controller 20 stops working to turn off the boost switch Qr. Thus, the surface temperature of the boost switch Qr is reduced, not only the safety standards are met but the over-current protection is also achieved.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight driving circuit, applied in a liquid crystal display, wherein the backlight driving circuit comprises a voltage conversion circuit, a PWM controller, a zener diode, a first electrical switch, an optocoupler unit, a boost switch and a light source drive assembly, and the voltage conversion circuit is used to connect an input voltage end to receive an input voltage and to conduct a voltage conversion of the input voltage, and the voltage conversion circuit is also connected to the optocoupler unit, the PWM controller, the boost switch and a light source of the liquid crystal display to output a converted voltage to the optocoupler unit, the PWM controller, the boost switch, and the light source, and the PWM controller is used to control an output of the voltage conversion circuit, and the light source drive assembly is connected to the boost switch and the light source to control on and off of the boost switch according to a light source condition, and a cathode of the zener diode is connected to the optocoupler unit, and an anode of the zener diode is connected to a control end of the first electric switch, and a first end of the first electrical switch is connected to the PWM controller, and a second end of the first electrical switch is grounded;

as the boost switch is short, a current outputted by the voltage conversion circuit increases, and a voltage of the optocoupler unit fed back to the zener diode is larger than a breakdown voltage, and the zener diode is on and then, the first electric switch is on, and the PWM controller stops working to turn off the boost switch.

2. The backlight driving circuit according to claim 1, wherein the voltage conversion circuit comprises a transformer, a second electrical switch, a first resistor, a first capacitor, a first diode, a second diode and a second resistor, and the input voltage end is connected to a first end of a first primary coil of the transformer and is connected to a cathode of the first diode through the first resistor, and the first capacitor is connected in parallel at both ends of the first resistor, and an anode of the first diode is connected to a first end of the second electrical switch, and the anode of the first diode is also connected to a second end of the first primary coil of the transformer, and a control end of the second electrical switch is connected to the PWM controller, and a second end of the second electrical switch is grounded, and a first end of a second primary coil of the transformer is connected to an anode of the second diode, and a cathode of the second diode is connected to a voltage end of the PWM controller through the second resistor, and the voltage end of the PWM controller is connected to the first end of the first electrical switch, and a secondary coil of the transformer is connected to a first end of the boost switch.

3. The backlight driving circuit according to claim 2, wherein the light source drive assembly comprises a third electric switch, a control unit and a third resistor, and a control end of the third electric switch is connected to the control unit, and a first end of the third resistor is connected to the light source, and a second end of the third resistor is grounded through the third resistor, and the control unit is also connected to the boost switch to control the on and off of the boost switch according to a voltage condition of the third resistor.

4. The backlight driving circuit according to claim 3, wherein the optocoupler unit comprises a fourth resistor, a fifth resistor, a sixth resistor, a seventh resistor, a voltage regulator and an optocoupler, and the fourth resistor and the fifth resistor are connected in series between the secondary coil of the transformer and a first end of the voltage regulator, and a second end of the voltage regulator is grounded, and the sixth resistor and the seventh resistor are connected the secondary coil of the transformer and a ground, and a reference end of the voltage regulator is connected to a node between the sixth resistor and the seventh resistor, and an anode of a light emitting diode of the optocoupler is connected to a node between the fourth resistor and the fifth resistor, and a cathode of the light emitting diode of the optocoupler is connected to a node between the fifth resistor and the voltage regulator, and a first end of a switch of the optocoupler is connected to the PWM controller and the cathode of the zener diode, and a second end of the switch of the optocoupler is grounded.

5. The backlight driving circuit according to claim 4, wherein the voltage conversion circuit further comprises a third diode, the fourth diode and a second capacitor, and an anode of the third diode is connected to an anode of the fourth diode and also connected to a first end of the secondary coil of the transformer, and a cathode of the third diode is connected to the anode of the fourth diode and also connected to a positive electrode of the second capacitor, and a negative electrode of the second capacitor is ground, and a second end of the secondary coil of the transformer is grounded.

6. The backlight driving circuit according to claim 5, wherein the voltage conversion circuit further comprises a third capacitor and a fourth capacitor, and a positive electrode of the third capacitor is connected to the input voltage end, and a negative electrode of the third capacitor is grounded, and the fourth capacitor is connected in parallel at both ends of the third capacitor.

7. The backlight driving circuit according to claim 6, wherein the backlight driving circuit further comprises a fifth capacitor and a sixth capacitor, and a positive electrode of the fifth capacitor is connected to the cathode of the second diode through the second resistor, and a negative electrode of the fifth capacitor is grounded, and a positive electrode of the sixth capacitor is connected to the cathode of the third diode, and a negative electrode of the sixth capacitor is grounded.

8. The backlight driving circuit according to claim 7, wherein the backlight driving circuit further comprises a fifth diode, an energy storage inductor and a seventh capacitor, an anode of the fifth diode is connected to the cathodes of the third diode and the fourth diode through the energy storage inductor, and a cathode of the fifth diode is connected to the anode of the light source, a cathode of the light source is connected to the first end of the third electrical switch, and the cathode of the fifth diode is also connected to a positive electrode of the seventh capacitor, and a negative electrode of the seventh capacitor is grounded.

9. The backlight driving circuit according to claim 6, wherein the boost switch, the second electrical switch and the third electrical switch are all NPN type transistors, and the control end, the first end and the second end of the boost switch, the control end, the first end and the second end of the second electrical switch and the control end, the first end and the second end of the third electrical switch respectively are gates, drains and sources, and the first electrical switch is an NPN type triode, and the control end, the first end and the second end of the first electrical switch respectively are a base, a collector and an emitter.

10. A liquid crystal display, comprising a light source and a backlight driving circuit, and the backlight driving circuit being connected to the light source, wherein the backlight driving circuit comprises a voltage conversion circuit, a PWM controller, a zener diode, a first electrical switch, an optocoupler unit, a boost switch and a light source drive assembly, and the voltage conversion circuit is used to connect an input voltage end to receive an input voltage and to conduct a voltage conversion of the input voltage, and the voltage conversion circuit is also connected to the optocoupler unit, the PWM controller, the boost switch and the light source of the liquid crystal display to output a converted voltage to the optocoupler unit, the PWM controller, the boost switch, and the light source, and the PWM controller is used to control an output of the voltage conversion circuit, and the light source drive assembly is connected to the boost switch and the light source to control on and off of the boost switch according to a light source condition, and a cathode of the zener diode is connected to the optocoupler unit, and an anode of the zener diode is connected to a control end of the first electric switch, and a first end of the first electrical switch is connected to the PWM controller, and a second end of the first electrical switch is grounded;
as the boost switch is short, a current outputted by the voltage conversion circuit increases, and a voltage of the optocoupler unit fed back to the zener diode is larger than a breakdown voltage, and the zener diode is on and then, the first electric switch is on, and the PWM controller stops working to turn off the boost switch.

11. The liquid crystal display according to claim 10, wherein the voltage conversion circuit comprises a transformer, a second electrical switch, a first resistor, a first capacitor, a first diode, a second diode and a second resistor, and the input voltage end is connected to a first end of a first primary coil of the transformer and is connected to a cathode of the first diode through the first resistor, and the first capacitor is connected in parallel at both ends of the first resistor, and an anode of the first diode is connected to a first end of the second electrical switch, and the anode of the first diode is also connected to a second end of the first primary coil of the transformer, and a control end of the second electrical switch is connected to the PWM controller, and a second end of the second electrical switch is grounded, and a first end of a second primary coil of the transformer is connected to an anode of the second diode, and a cathode of the second diode is connected to a voltage end of the PWM controller through the second resistor, and the voltage end of the PWM controller is connected to the first end of the first electrical switch, and a secondary coil of the transformer is connected to a first end of the boost switch.

12. The liquid crystal display according to claim 11, wherein the light source drive assembly comprises a third electric switch, a control unit and a third resistor, and a control end of the third electric switch is connected to the control unit, and a first end of the third resistor is connected to the light source, and a second end of the third resistor is grounded through the third resistor, and the control unit is also connected to the boost switch to control the on and off of the boost switch according to a voltage condition of the third resistor.

13. The liquid crystal display according to claim 12, wherein the optocoupler unit comprises a fourth resistor, a fifth resistor, a sixth resistor, a seventh resistor, a voltage regulator and an optocoupler, and the fourth resistor and the fifth resistor are connected in series between the secondary coil of the transformer and a first end of the voltage regulator, and a second end of the voltage regulator is grounded, and the sixth resistor and the seventh resistor are connected the secondary coil of the transformer and a ground, and a reference end of the voltage regulator is connected to a node between the sixth resistor and the seventh resistor, and an anode of a light emitting diode of the optocoupler is connected to a node between the fourth resistor and the fifth resistor, and a cathode of the light emitting diode of the optocoupler is connected to a node between the fifth resistor and the voltage regulator, and a first end of a switch of the optocoupler is connected to the PWM controller and the cathode of the zener diode, and a second end of the switch of the optocoupler is grounded.

14. The liquid crystal display according to claim 13, wherein the voltage conversion circuit further comprises a third diode, the fourth diode and a second capacitor, and an anode of the third diode is connected to an anode of the fourth diode and also connected to a first end of the secondary coil of the transformer, and a cathode of the third diode is connected to the anode of the fourth diode and also connected to a positive electrode of the second capacitor, and a negative electrode of the second capacitor is ground, and a second end of the secondary coil of the transformer is grounded.

15. The liquid crystal display according to claim 14, wherein the voltage conversion circuit further comprises a third capacitor and a fourth capacitor, and a positive electrode of the third capacitor is connected to the input voltage end, and a negative electrode of the third capacitor is grounded, and the fourth capacitor is connected in parallel at both ends of the third capacitor.

16. The liquid crystal display according to claim 15, wherein the backlight driving circuit further comprises a fifth capacitor and a sixth capacitor, and a positive electrode of the fifth capacitor is connected to the cathode of the second diode through the second resistor, and a negative electrode of the fifth capacitor is grounded, and a positive electrode of the sixth capacitor is connected to the cathode of the third diode, and a negative electrode of the sixth capacitor is grounded.

17. The liquid crystal display according to claim 16, wherein the backlight driving circuit further comprises a fifth diode, an energy storage inductor and a seventh capacitor, an anode of the fifth diode is connected to the cathodes of the third diode and the fourth diode through the energy storage inductor, and a cathode of the fifth diode is connected to the anode of the light source, a cathode of the light source is connected to the first end of the third electrical switch, and the cathode of the fifth diode is also connected to a positive electrode of the seventh capacitor, and a negative electrode of the seventh capacitor is grounded.

18. The liquid crystal display according to claim 15, wherein the boost switch, the second electrical switch and the third electrical switch are all NPN type transistors, and the control end, the first end and the second end of the boost switch, the control end, the first end and the second end of the second electrical switch and the control end, the first end and the second end of the third electrical switch respectively are gates, drains and sources, and the first electrical switch is an NPN type triode, and the control end, the first end and the second end of the first electrical switch respectively are a base, a collector and an emitter.

* * * * *